March 12, 1946.   A. G. PETERKIN   2,396,285
CONVERSION OF HYDROCARBONS
Filed Dec. 19, 1941
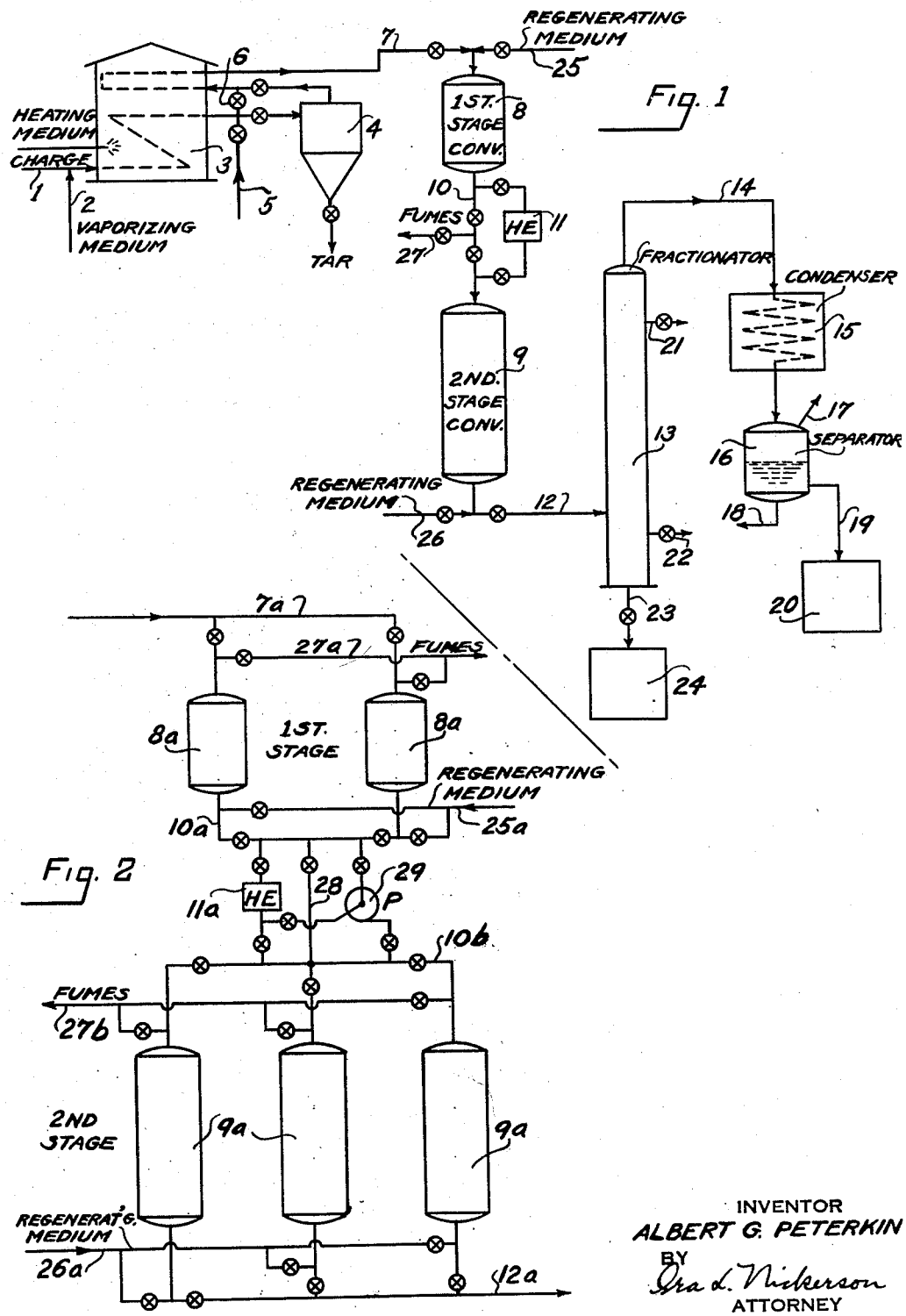
INVENTOR
ALBERT G. PETERKIN
BY
Ira L. Nickerson
ATTORNEY Patented Mar. 12, 1946

2,396,285

UNITED STATES PATENT OFFICE 2,396,285

CONVERSION OF HYDROCARBONS

Albert G. Peterkin, Bryn Mawr, Pa., assignor to Houdry Process Corporation, Wilmington, Del., a corporation of Delaware Application December 19, 1941, Serial No. 423,577

8 Claims. (Cl. 196—52)

This invention has to do with the conversion of higher boiling hydrocarbons into lower boiling hydrocarbons by catalysis in the commercial production of high grade motor fuels and burning fuels. While by no means restricted thereto, it has special application to heavy hydrocarbon charging stocks including or comprising bottom cuts or fractions from any source such as petroleum, products of destructive distillation of coal, lignite, schist, etc.

Many catalysts suitable for the cracking of hydrocarbons are available. For high quality motor fuels with high octane ratings, those of a silicious nature, especially blends of silica and alumina, with or without the inclusion of other active ingredients have been found to be particularly desirable and are now in extensive use. Such silica-alumina blends may be derived from natural deposits such as clays, ores and the like and catalysts of this general type may also be produced synthetically by interaction of solutions and by precipitation therefrom. This artificial production of catalysts permits the original ingredients and the subsequent treatment to be varied so that catalysts can be made which are infinite in variety and effects. Synthetic catalysts of a silicious nature may be prepared containing one or more metallic oxides coprecipitated with silica or added by base exchange, absorption, deposition or otherwise. If catalysts of natural and artificial origin are deemed to be too active it is possible to reduce or modify their activity by suitable treatment involving the use of heat or chemicals, or both. In most instances cracking catalysts function to best advantage when the operations are conducted wholly in vapor phase, so that liquid hydrocarbons atomized or otherwise entrained with the charge do not enter the catalytic zone.

The measure of the activity of a catalyst may be taken as the yield or production from a given charging stock of material boiling in the motor fuel range, plus the yield or production of still lower boiling hydrocarbons, including fixed gases. As this total yield increases through the use of catalysts of very high activities it has been found that the proportion of materials boiling below the motor fuel range coonsistently rises. Since the very low boiling or gaseous hydrocarbons are relatively low in value the yield of motor fuel which may be obtained is limited by economic considerations, and advantage cannot be taken of high catalyst activity unless it is possible to use such catalysts under conditions which are favorable to high production of motor fuel. The major limitations are in the nature of space rate and temperature.

In the case of heavy hydrocarbon charging stocks the relation between the oil partial pressure and the temperature is such that if the conditions are chosen to give the optimum cracking results, that is low gas make and high gasoline yield, with many catalysts the charge will not be wholly in the vapor phase. In other words, if the charge stock is introduced to the catalytic chamber in the vapor phase, that is at temperatures above its dew point, and if the attempt is made to hold the temperature within the catalytic case below the dew point of the charge, condensation will take place within the case with the resulting formation of coky deposits originating in the condensed liquid and unevenly distributed within the chamber, both on the catalyst used and on the metal surfaces of the case as well as on any vapor distributing or heat removal means within the case; and with the result that when the catalyst deposit is removed by oxidation during the regeneration period of the cracking cycle, uneven temperatures will be experienced and harmfully high temperatures at such points as condensation has taken place. On the other hand, if the temperature within the catalytic case is held above the dew point of the charge, the gas make will be excessive and the yield of motor fuel low.

As the space rate is increased on a catalyst of any given activity the total yield of cracked products in and below the motor fuel boiling range decreases and the proportion of motor fuel in the light cracked product increases. It has been found that for yields of a lower order than are economically feasible in commercial practice, relatively high temperatures may be employed if the space rate is sufficiently increased over that which would be used for normal commercial yields. Thus by combination of relatively high temperature and high space rates relatively low yields may be obtained without the formation of an unduly high proportion of materials boiling below the motor fuel range. In the course of such an operation the high boiling materials are sufficiently cracked as to materially reduce the dew point of the charge stock. In practical operation the amount of cracking may be varied within very wide limits. It might be expected that as the space rate was increased the amount of non-volatile material deposited on the catalyst would increase and thereby the maximum space rate which could be employed in practice and the range of cracking obtainable would be limited, since for any commercial design of catalyst chamber the amount of deposit which can be removed is limited by the amount of cooling surface provided and oxidizing medium available during the regeneration portion of the cycle. It is now discovered, however, that this limitation does not exist since as the space rate is increased, above a certain value, generally in the neighborhood of one, the amount of non-volatile material deposited on the catalyst remains constant. The charge stock cracked to the desired extent may then be introduced in the vapor form to a second catalytic chamber. The limitation imposed by the dew point of the charge stock being thus removed, the temperature within the second chamber may be held at such a point as will enable the particular catalyst being employed to give optimum results both with reference to the yield of gasoline and to the proportion of motor fuel and lighter cracked products.

By thus using two catalytic cases in series in the first of which relatively high space rates and temperatures above the dew point are maintained and in the second lower space rates and temperatures below the dew point of the charge stock are employed, high yields of motor gasoline may be produced without the formation of uneconomical proportions of hydrocarbons of lower boiling range than motor fuel. Furthermore, it has been found that the total amount of catalyst used to produce a given yield of motor fuel may be either the same or less than the amount used when a single catalytic case is employed.

On high boiling residuals from which a large proportion of the commercial production of gasoline is made, dew points of the order of 850° F. under practical operating conditions are typical. The yield of gasoline from such stocks is economically limited by the production of unduly large proportions of low boiling materials since with highly active catalysts the optimum temperature for cracking hydrocarbons is generally in the range of 725° to 840° F.

This series method of operation has further advantages over single case operations as follows:

(a) By removing the temperature limitation imposed by the dew point of the charge it permits a much wider choice of catalysts. For example, certain catalysts give their best results at a lower temperature level than others. Since the dew point of the vapor entering the second case is a function of the amount of cracking taking place in the first case, the choice of the catalysts for the second case is greatly widened because of the wider temperature range afforded by the preliminary operation.

(b) One unfavorable characteristic of the heavy charge stocks herein considered is the tendency even above their dew points to give uneven deposits of non-volatile material throughout the catalyst bed, resulting in harmful high temperatures during regeneration at the points of high concentrations of catalyst deposit. By the series method of operation of the present invention this phenomenon is limited to the first case and even deposits are usually obtained in the second case thus limiting the harmful effects to a minor portion of the total catalyst employed. One object of the invention is to devise ways and means whereby the heavier cuts of petroleum may be cracked under conditions which are properly chosen with respect to catalyst activity and desired yield. Another object is to avoid the difficulty imposed upon conventional operation to maintain the operating temperature above the dew point of the charging stock. Another object is to improve the yields of desirable products over those heretofore attained in the usual once-through catalytic operation. Still other objects will be apparent from the detailed description which follows.

The invention involves a two stage but once-through catalytic operation in which the first stage is utilized to effect a limited degree of conversion directed to preparing a suitable charge for a second catalytic cracking stage. Specifically the purpose of the first stage is to restrict the boiling range of the hydrocarbons charged thereto to such an extent that they will not reach "dew point" when passed on to the second stage which is operated at lower temperature than the first stage and usually below the "dew point" of the original charge. The same, similar or different catalytic material may be used in the successive stages. The operating conditions selected for the second cracking stage are those which will give the best yields of desired products and the temperature is generally in the range of about 750 to 840° F. (725° F. minimum) and below the "dewpoint" of normal heavy charging stocks. Hence the first stage is operated at higher temperature (as of the order of 850° to 950° F. with 825° F. as a minimum) and with other suitable provisions, as addition of gaseous diluents or vaporizing media, to avoid condensation but excessive cracking is avoided or suitably minimized by passing the charge through this catalytic zone at high rate. The effect sought and attained is the splitting of the heaviest hydrocarbons with a consequent lowering of boiling points so that all of the products of the first stage operation may pass directly to the second stage without possibility of condensation in the latter in spite of its lower temperature of operation. The quantity of catalyst required for this two stage operation is ordinarily no greater than for previous single stage operations and in many instances it is less due to higher feed rates, especially in the first stage. By proper choice of conditions there is also normally an increase in yield of products in the gasoline boiling range of from 2 to 6%, or more, over single stage operations. By modifying or adjusting the operating conditions somewhat in either or both stages it is also possible to vary the quantity and character of the resulting products to a considerably greater extent than can be done with single stage operations. In preparing the charge for the first catalytic stage suitable apparatus, such as a tar separator or coking equipment, will be provided when necessary to remove unvaporizable components, such as tar, asphalt and asphaltines. However, to get the most gasoline from a topped crude it is desirable to remove the least possible amount of tarry components. Consequently the resulting charge for cracking tends to have a wide boiling range and a high dew point.

In processing stocks which vaporize under desired operating conditions at temperatures too high for optimum results from a given and desirable catalyst, the two-step process affords a means of obtaining important advantages, including that of operating eventually at temperatures below the dew point of the charging stock without requiring a larger quantity of catalyst than is necessary for the usual one-stage operation. This is accomplished by dividing the catalyst and using two catalytic cases in series, the first of which contains a relatively small proportion of the total catalyst required. Thus, if a single step operation with a given catalyst and given charging stock requires a space rate of 1:1 (one volume of charge measured as liquid to one volume of catalyst), the first case may contain 25% of the catalyst and operate at a space rate of 4:1, the second case 75% of the catalyst and operate at a space rate of 1.33:1. In the first case, a reaction temperature is selected which is safely above the dew point of the entering vapors as from 850° to 950° with suitable adjustment of the quantity of vaporizing medium in relation to the pressure maintained in the case. The conditions may be adjusted to cause any desired percentage of the reaction to take place in this case, as from 30 to 60% of the reaction, and the splitting of the charge will reduce the boiling range of the material leaving this case so that its atmospheric dew point will be substantially lowered, as to about 710° F. The reaction is then completed in the second case in the temperature range of 725° to 840°, for example. Since the usual cracking operation requires a pressure of at least 7 to 10 lbs. per sq. in. gage to carry the products through the fractionating and condensing apparatus the normal result is that the second catalytic case operates at a temperature below the dew point of the original charge. In this way a selective cracking operation is conducted in both catalytic chambers so as to minimize the production of very light gaseous products of low value, in the first catalytic case by the high space rates, and in the second case where the cracking reaction is completed by the low temperatures. Thus the combination of these two steps substantially increases the yield of the more valuable products boiling in the motor fuel range. The contaminating deposits on the catalyst in both cases are held to limits which permit convenient regenerations.

Suitable apparatus for practicing the invention is indicated by the accompanying drawing in which:

Fig. 1 is a diagrammatic showing of the principal pieces of apparatus and their connections in a commercial cracking plant; and Fig. 2 is a diagrammatic view of a modification of the catalytic part of the equipment.

The heavy hydrocarbon charge in feed line 1 (Fig. 1) is mingled with the required quantity of vaporizing medium, such as steam for example, supplied by line 2, the mixture passing to the heating coil of still 3 where the charge is vaporized, any unvaporized portions being separated out in tar separator 4. Additional steam may be supplied to the mixture by line 5 in advance of tar separator 4, if necessary or desirable. If the charge contains no unvaporized material the tar separator may be by-passed by valved line 6 to conduct the mixture directly to a super-heating coil in still 3 whence the charge, completely in vapor phase, passes by line 7 to catalytic converter 8 forming the first catalytic cracking zone. The catalyst in converter 8 is maintained at a temperature above 825° F. and above the "dew point" of the charge. All of the products from the first converting zone 8 pass directly to a second and larger catalytic converter 9 maintained at a suitable temperature below 850° F. to complete the reaction. If the valved connecting line 10 between converters 8 and 9 is sufficiently long, or if the heat loss in the exothermic reaction taking place in the first stage is sufficient to bring the products to the proper temperature for the reaction in converter 9, the products pass directly from converter 8 to converter 9; otherwise, they are sent through heat exchanger 11 where suitable adjustment of temperature is made before the partly cracked materials enter converter 9. From the second converting zone 9 the products pass by line 12 to fractionating equipment, such as tower 13, which is suitably controlled to pass gasoline and gaseous products overhead by line 14 to condenser 15, from which the products pass into separator 16. Fixed gases leave the latter by line 17, water by bottom outlet line 18 and gasoline by line 19 to storage in tank 20 or to additional treating equipment. Side cuts may be taken from fractionator 13 by lines 21 and 22, if desired, and the remaining heavier material is withdrawn by line 23 to storage tank 24 or to additional treating equipment.

Both converters may be regenerated simultaneously by closing valves in the hydrocarbon supply and outlet lines and opening the valves in lines 25 and 26 supplying regenerating medium above and below the two converters while the fumes of regeneration may be withdrawn by outlet line 27 intermediate the two converters. Alternatively, the regenerating medium may be admitted by line 27 and fumes withdrawn through lines 25 and 26. For continuous operation of a plant one or more additional sets of converters will be required so that at least one set is performing the cracking operation, while another or other sets are in regeneration.

Fig. 2 shows a modification in the arrangement of the catalytic converters whereby the converters in both the first and second stages operate independently rather than in sets, as in Fig. 1. The arrangement permits a greater degree of flexibility and fewer converters in the first stage. In the arrangement illustrated in Fig. 2 the hydrocarbon charge, wholly in vapor phase, passes by line 7a to either of converters 8a making up the first stage. One of these converters is normally on stream while the other is in regeneration, the regenerating medium for this stage being supplied by line 25a having valved branches to the lower end of each of the converters while the fumes are withdrawn from the upper part of the converters by valved branches to line 27a. The hydrocarbon products of the cracking reaction are conducted from converters 8a by valved branches to line 10a, whence there is a choice of four routes to supply line 10b, which has valved branches leading to converters 9a of the second cracking stage. If the reaction products are to pass directly from the first stage to the second stage they are sent through valved line 28. If temperature adjustment of the products is required appropriate valves are utilized to send the products through heat exchanger 11a. If the pressure is to be raised for the second stage the products are sent through vapor pump 29, suitable valved connections being provided as indicated to include the heat exchanger in the connection. After the reaction products pass through one of the converters 9a for the completion of the cracking reaction the products are conducted by line 12a to fractionating equipment. For the regeneration of the converters 9a in the second cracking stage valved branches extend to the lower end of each converter from supply line 26a for the regenerating medium and the fumes are withdrawn from the upper ends of the converters by valved branches leading to line 27b. Since there are fewer converters in the first cracking stage than in the second stage in the arrangement shown in Fig. 2, those in the first stage may have different on-stream periods and may use a catalyst of lower activity than in the second stage so that the coke deposit will not become excessive. Since there are only two converters in the first stage they will have equal periods for on-stream and regeneration; on the other hand the three converters in the second stage can be operated to have a regeneration period which is twice the length of the on-stream period, hence if the on-stream periods for both stages is 15 minutes the regeneration period for the first stage only may also be 15 minutes but will be 30 minutes for the second stage since one converter will be on stream while the other two are in regeneration.

The converters 8 and 8a, 9 and 9a may be of any known or desired type. Best results, however, are obtainable with converters having means for efficient temperature control of the entire catalytic zone, as through indirect heat exchange with an extraneous heat exchange fluid, for example by circulating such fluid through heat exchange conduits embedded in the catalyst and having fins projecting therefrom so that all parts of the catalyst are maintained at substantially uniform temperature. By maintaining the heat exchange fluid at or above the minimum temperature desired or required by the reaction, condensation of reactant vapors on the catalyst is entirely avoided. The catalyst, which is preferably in the form of pellets, fragments or molded pieces, may be of the same type, form or activity or of different type, form or activity in the two converters. While the converters may be arranged to have the catalyst in movement continuously or intermittently therethrough and regenerated elsewhere, it is preferable, however, to use stationary catalyst and to regenerate the same in place, as indicated.

The following Mid-Continent petroleum fraction is typical of high boiling charging stocks for the conversion or which the present invention is adapted.

*Table 1*

| | | |
|---|---|---|
| API gravity | degrees | 31.0 |
| Initial | °F | 180 |
| 5% | °F | 475 |
| 10% | °F | 520 |
| 20% | °F | 570 |
| 30% | °F | 590 |
| 40% | °F | 625 |
| 50% | °F | 655 |
| 60% | °F | 700 |
| 70% | °F | 740 |
| 80% | °F | 795 |
| 90% | °F | 870 |
| 95% | °F | 915 |
| E. P. | °F | 980 |
| Recovery | per cent | 98.0 |

In general, it is impractical to operate a cracking unit at less than 7–10 lbs. gage pressure. In order to obtain the most cracking and highest yields of motor fuel, it is generally desirable to operate at the highest possible oil partial pressure. The following table gives the calculated dew point for the above stock under several conditions:

*Table 2*

| Pressure, lbs./sq. in. gauge | Steam, parts/100 parts oil (by weight) | Absolute oil partial pressure | | Dew point, °F. |
|---|---|---|---|---|
| | | Lbs./sq. in. | Atm. | |
| 0 | 0 | 14.7 | 1.00 | 825 |
| 5 | 0 | 19.7 | 1.34 | 852 |
| 5 | 2.1 | 14.7 | 1.00 | 825 |
| 10 | 0 | 24.7 | 1.68 | 875 |
| 10 | 4.2 | 14.7 | 1.00 | 825 |
| 20 | 0 | 34.7 | 2.36 | 910 |
| 20 | 3.9 | 21.2 | 1.44 | 860 |
| 20 | 8.5 | 14.7 | 1.00 | 825 |

Thus, to have the absolute oil partial pressure of atmospheric operation when the system is under 5# pressure, 2.1 parts of steam by weight are required; at 10# pressure the quantity of steam necessary is 4.2 parts by weight; and at 20# pressure 8.5 pounds. These amounts of steam, however, give no factor for a margin of safety over the dew point. Hence, larger quantities of steam or other vaporizing medium would be necessary thereby reducing the partial pressure of the oil. For a safe operation the temperature for a single pass cracking operation should average 850° F. with an absolute minimum of 825° F. if no steam and no pressure are used. However, by utilizing a first pass or catalytic operation according to the present invention to control the dew point in which the feed rate is adjusted to give a high recovery of liquid the gasoline yield can be ignored for the time being. A stable catalyst of low or moderate activity may be utilized under 20# pressure and at an average temperature of 885° F. requiring only about 3.9 parts of steam per 100 parts of oil to give a safe operation. The rate is then chosen to give substantially 100% volume recovery of liquid, as in the range of 2.5:1 to 6:1 depending on catalyst activity. By this operation the average atmospheric dew point is reduced from about 825° F. as shown above to about 710° F. With such a lowering of the dew point the conditions of the second catalytic stage can be chosen so that the catalyst utilized (usually more active than in the first catalytic zone), can operate at highest efficiency and give highest yield of motor fuel. Catalyst activities are normally chosen to give a coke deposit in both zones which can be removed in an economical time cycle, as 15 minutes on stream and 15 minutes in regeneration when two sets of catalytic chambers are provided or 10 minutes on stream and 20 minutes in regeneration when three sets of catalytic chambers are provided for Fig. 1. The arrangement of Fig. 2 gives more latitude for operation as previously described. Typical operating conditions and results of the two-stage operation of the present invention in comparison with the usual one-stage operation are given in the following table.

*Table 3*

[Stock—40-83% Mid-Continent crude of gravity and boiling range shown in Table 1]

| | Two stage operation; operation according to Fig. 2. First stage on stream 20 minutes, second stage on stream 10 minutes | | | Single stage operation; on stream period, 10 minutes |
|---|---|---|---|---|
| | First stage | Second stage | Cumulative | |
| Feed rate | 3.2:1 | 1.6:1 | 1.25:1 | 1.25:1 |
| Average catalyst temperature, °F | 880 | 835 | | 855 |
| Min. catalyst temp., °F | 860 | 810 | | 835 |
| Press, lbs./sq. in | 20 | 17 | | 10 |
| Steam, weight percent | 5 | 5 | | 5 |
| Yields: | | | | |
| Gas, weight percent | 2.8 | 4.9 | 7.7 | 6.7 |
| Coke, weight percent | 0.8 | 3.0 | 3.8 | 3.6 |
| Coke g./l. (grams per liter) | 6.6 | 7.2 | | 7.4 |
| Liquid recovery, percent volume | 99.6 | 96.4 | 96.4 | 96.5 |
| Gasoline, 400° E. P., percent volume | 18.0 | 45.4 | 45.4 | 41.1 |
| CFR motor | | | 78.1 | 80.2 |

In the above operations activated clay catalysts of the type disclosed in patent 2,078,945 issued May 4, 1937 to E. J. Houdry were utilized. The activity of the catalyst used in the second stage of the first or two stage operation and in the single stage operation was the same, catalyst of slightly lower activity being utilized in the first stage of the two-stage operation.

Similar comparative operations are given in the following table on another stock, namely a 56–88% cut of East Texas crude with a boiling range of 560–1010° F. and an atmospheric dew point of 920° F., the dew point changing to 850° F. under 8 lbs. per square inch gauge pressure with 15% of steam.

Table 4

[Stock—56–88% East Texas crude, A. P. I. gravity 28.6°]

| | Two stage operation; operation according to Fig. 1, both stages on stream 10 minutes | | | Single stage operation; on stream period, 10 minutes |
|---|---|---|---|---|
| | First stage | Second stage | Cumulative | |
| Feed rate | 4:1 | 1.35:1 | 1:1 | 1:1 |
| Average catalyst temperature, °F | 870 | 840 | | 870 |
| Min. catalyst temp., °F | 850 | 815 | | 850 |
| Press., lbs./sq. in. ga | 8 | 7 | | 8 |
| Steam, per cent weight | 15 | 15 | | 15 |
| Yields: | | | | |
| Gas, per cent weight | 2.8 | 8.1 | 10.9 | 9.9 |
| Coke, per cent weight | 1.0 | 3.7 | 4.7 | 4.2 |
| Coke, g./l | 5.8 | 7.1 | | 6.2 |
| Liquid recovery, per cent volume | 99.3 | 93 | 92.4 | 93 |
| Gasoline, 410° E. P., per cent volume | 18 | 48.1 | 48.1 | 44 |
| CFR motor | | | 79.5 | 79.8 |

Activated clay catalysts were utilized with a relatively low activity catalyst being used for the first stage of the two-stage operation and considerably higher activity for the second stage. The catalyst of the single stage operation was of slightly lower activity than that of the second stage catalyst.

It is apparent from the comparative operations set forth in Tables 3 and 4 that higher gasoline yields result from the use of the two stage operation of the present invention with little if any loss in liquid recovery as compared with the conventional one-stage operation. In the matter of the octane rating of the gasoline, that from the two-stage operations is usually slightly lower than from the one-stage operation (note Table 3), but it is often about the same as in Table 4. Variations in gasoline make, octane rating, liquid recovery, etc. are dependent upon the nature of the charging stock, the type and activity of catalysts employed, and the selection of operating conditions.

From the above it will be seen that for maximum yield of gasoline from a heavy or high boiling charging stock the two-stage catalytic operation of the present invention should be utilized, that the quantity of catalyst required is no greater than for single stage operations and can be less, as in the arrangement of Fig. 2, that there is high liquid recovery along with the high gasoline yield, and that by suitably adjusting the "dew point" in the first cracking stage any desired lower temperature with either lower or higher pressure may be provided for the second or final cracking stage to utilize the catalyst in that stage to the best advantage in the matter of high yields and high quality of products. In most instances the space rate in the preliminary crecking converter will be at least twice the space rate in the second or final cracking converter and the space rate in the latter is usually at least 1:1 and not above 2:1.

I claim as my invention:

1. In the conversion of high boiling hydrocarbons by the action of catalysts which give best yields at temperatures below the "dew point" of the charge, the process step of preparing the charge for conversion by such catalyst by first sending it in vapor phase condition at temperature above its "dew point" and at high rate through a body of catalyst in a first catalytic zone thereby to restrict its boiling range through splitting of its heaviest components and then sending all products thereof directly to such catalyst in a second catalytic zone while still in vapor phase but at a temperature below the "dew point" of the original charge and at lower rate to complete the conversion thereby avoiding all condensation in both said catalytic zones.

2. In the conversion of high boiling hydrocarbons by the action of high activity catalysts which give best yields at temperatures below the dew point of the charge, the process step of preparing the charge for conversion by said catalyst by first sending it in vapor phase condition at high temperature and at a rate of at least 2.5:1 (two and a half volumes of liquid hydrocarbons to one volume of catalyst per hour) through a body of cracking catalyst and then sending all products thereof directly to a larger mass of said high activity catalyst at lower temperature and at a much lower rate than to said first body of catalyst thereby to complete the conversion of the charge while avoiding condensation of said hydrocarbons on either catalyst.

3. In the conversion of high boiling hydrocarbons by the action of catalysts which give best yields at temperatures below the dew point of the charge, the process step of preparing the charge for conversion by such catalyst by first sending it in vapor phase condition within the temperature range of 825 to 950° F. and at high rate through a body of cracking catalyst and then sending all products thereof directly through a larger mass of said catalyst maintained at a lower temperature but in the range of 725 to 840° F. at a lower feed rate to complete the conversion while avoiding condensation of said hydrocarbons on both catalysts.

4. In the conversion of high boiling hydrocarbons by the action of high activity catalysts which give best yields at temperatures below the dew point of the charge, the process step of preparing the charge for conversion by said catalyst by first sending it in vapor phase condition within the temperature range of about 850 to 950° F. and at a feed rate in the range of 2.5:1 to 6:1 through a body of cracking catalyst, and then sending all products thereof directly to a larger mass of high activity catalyst maintained in the temperature range of about 750 to 840° F. and at a feed rate below 2:1 to complete the conversion while avoiding condensation of said hydrocarbons on both catalysts.

5. In the catalytic conversion of a hydrocarbon charge having an atmospheric dew point above 800° F. by the action of high activity catalyst which gives best yields at temperatures below the dew point of the charge, the process step of preparing the charge for conversion by said catalyst by first subjecting it in vapor phase within the temperature range of 850 to 950° F. to the action of an adsorptive splitting catalyst and by controlling the operating conditions so as to lower the dew point of the resulting products below 750° F. and to obtain a liquid yield substantially equivalent to that of the charge, and then subjecting all products of said preparatory step in vapor phase and in the temperature range of 750 to 840° F. to the action of said high activity catalyst and controlling the operating conditions to obtain a high yield of products in the gasoline boiling range.

6. In the catalytic conversion of a heavy hydrocarbon oil having an atmospheric dew point of at least 800° F. to produce lower boiling hydrocarbons including gasoline hydrocarbons, the process comprising in a first stage intimately contacting a charge comprising said oil in vapor phase with particles of a cracking catalyst under cracking conditions including a relatively short time of contact of said charge with said catalyst and a catalyst temperature above the dew point of said charge, said conditions being selected to effect limited conversion of said oil to lower boiling materials, but being effective to reduce the dew point of the resulting vapor phase products below the dew point of said charge, and directly in a second stage intimately contacting vapor phase products of said first stage while still in vapor phase and without separation into fractions of differing boiling points with particles of cracking catalyst under cracking conditions including a relatively long time of contact and a catalyst temperature which is below the dew point of the original charge but above the dew point of said vapor phase products, said conditions of said second stage being selected to accomplish substantial cracking of said vapor phase products of said first stage including the production of a substantial amount of gasoline hydrocarbons, whereby said oil is converted to a high yield of gasoline, the major portion of which is produced in said second stage.

7. A process in accordance with claim 6 in which the cracking catalyst employed in the first stage has a lower activity than the catalyst employed in the second stage.

8. A process in accordance with claim 6 in which the catalyst employed in the first stage has substantially the same activity as the catalyst employed in the second stage.

ALBERT G. PETERKIN.